March 12, 1929.  E. B. THORNHILL  1,705,039

FURNACE FOR TREATMENT OF MATERIALS

Filed Nov. 1, 1926  3 Sheets-Sheet 1

INVENTOR.
Edwin Bryant Thornhill
BY Arthur P. Knight
Alfred W. Knight
ATTORNEYS.

March 12, 1929.  E. B. THORNHILL  1,705,039

FURNACE FOR TREATMENT OF MATERIALS

Filed Nov. 1, 1926   3 Sheets-Sheet 2

INVENTOR.
Edwin Bryant Thornhill
BY Arthur P. Knight
Alfred W. Knight
ATTORNEYS.

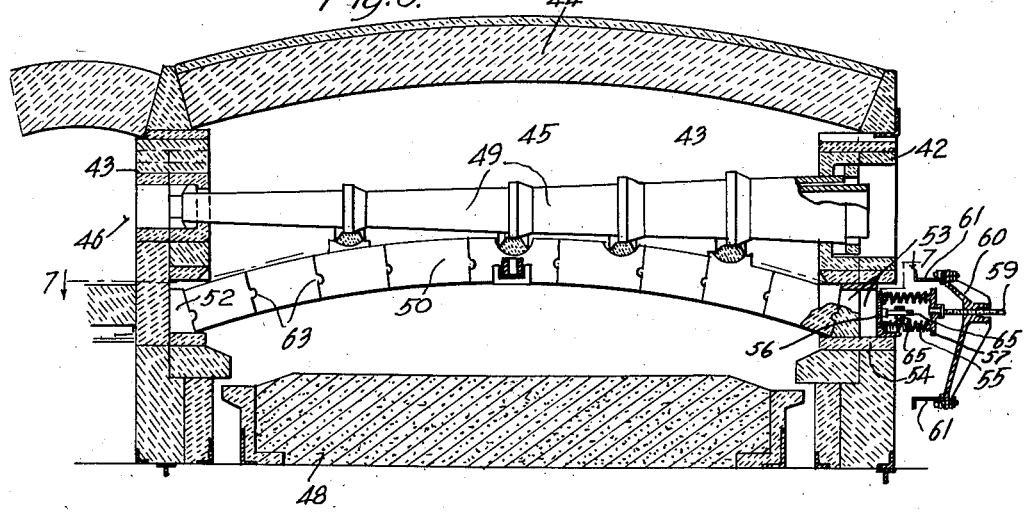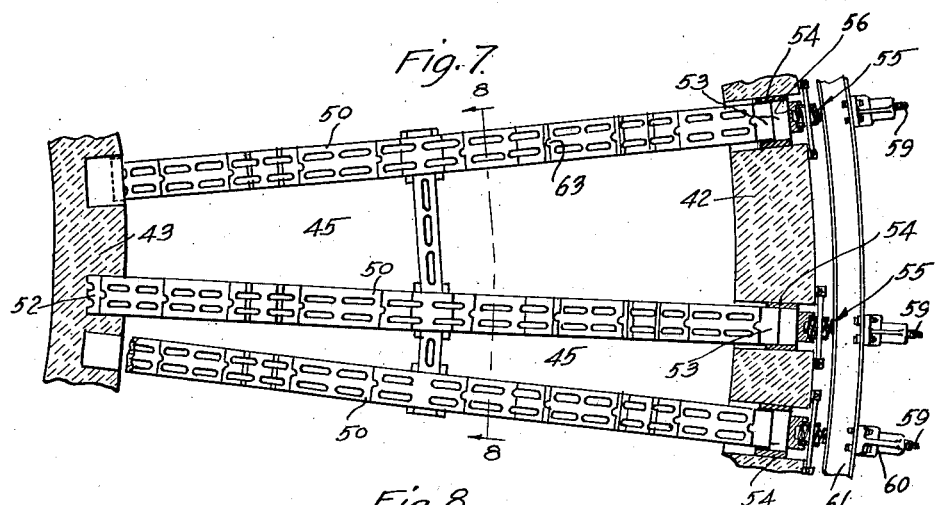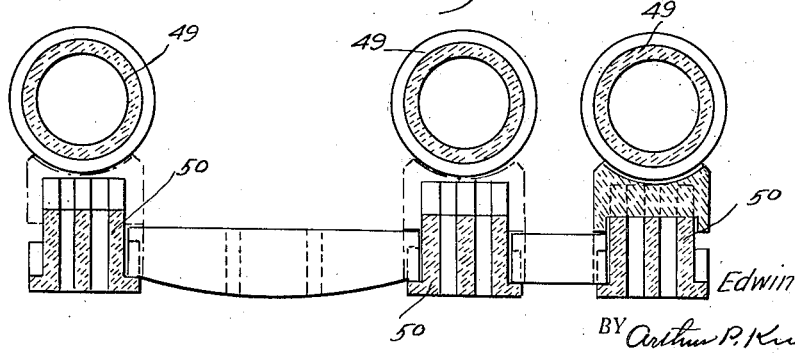

Patented Mar. 12, 1929.

1,705,039

UNITED STATES PATENT OFFICE.

EDWIN BRYANT THORNHILL, OF LONG BEACH, CALIFORNIA, ASSIGNOR TO THORNHILL-ANDERSON COMPANY, OF MUSKOGEE, OKLAHOMA, A CORPORATION OF OKLAHOMA.

FURNACE FOR TREATMENT OF MATERIALS.

Application filed November 1, 1926. Serial No. 145,470.

This invention relates to a furnace for treatment of materials, for purpose of effecting reduction of ores or for calcination, or for other purposes. The main object of the invention is to provide a furnace construction which is adapted to subject materials to radiated heat and to operate at a high temperature.

The accompanying drawing illustrate embodiments of my invention and referring thereto:

Fig. 6 is a vertical section showing the application of my invention to an annular furnace.

Fig. 7 is a horizontal section on line 7—7 in Fig. 6.

Fig. 8 is a vertical section on line 8—8 in Fig. 7.

Figure 1:
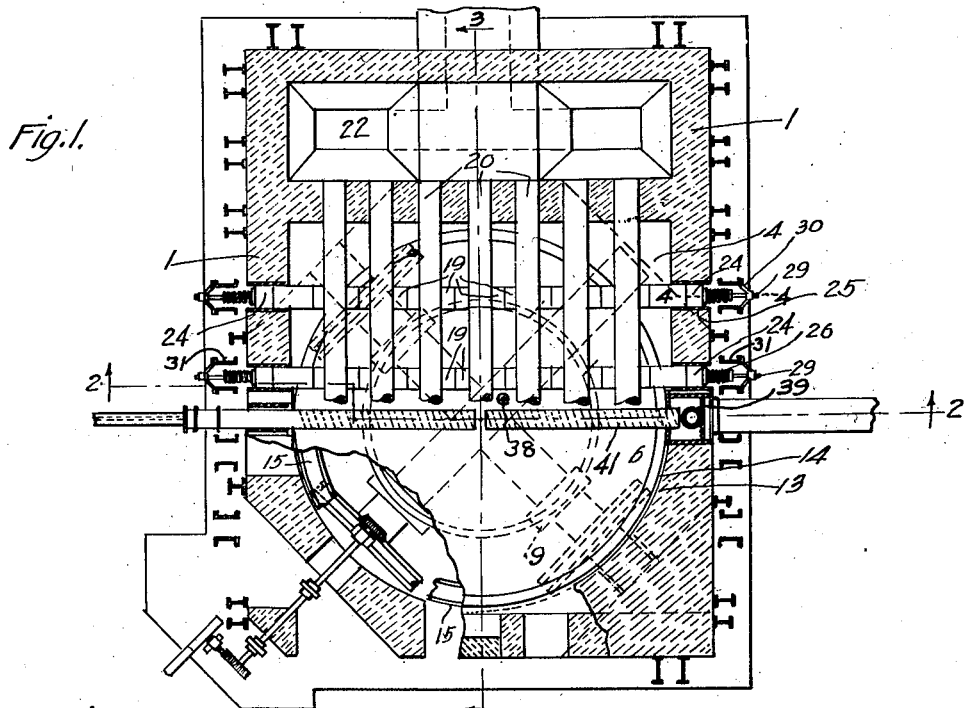
Fig. 1 is a horizontal section of the improved furnace on the line 1—1 in Fig. 3 showing the application of my invention to a furnace of the circular hearth type.
Figure 2:
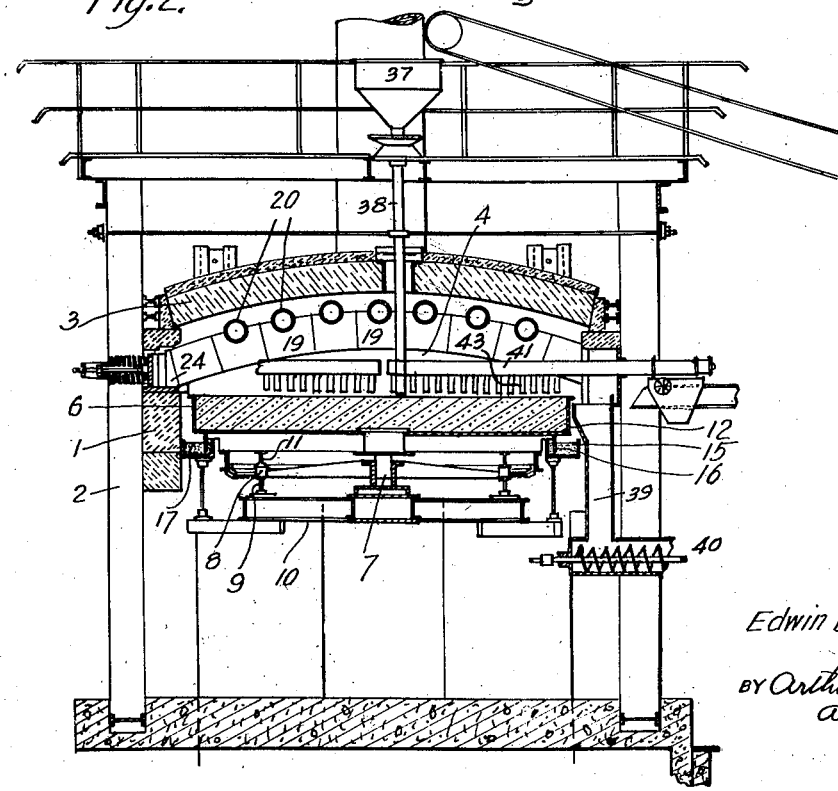
Fig. 2 is a vertical section of the furnace on line 2—2 in Fig. 1.
Figure 3:
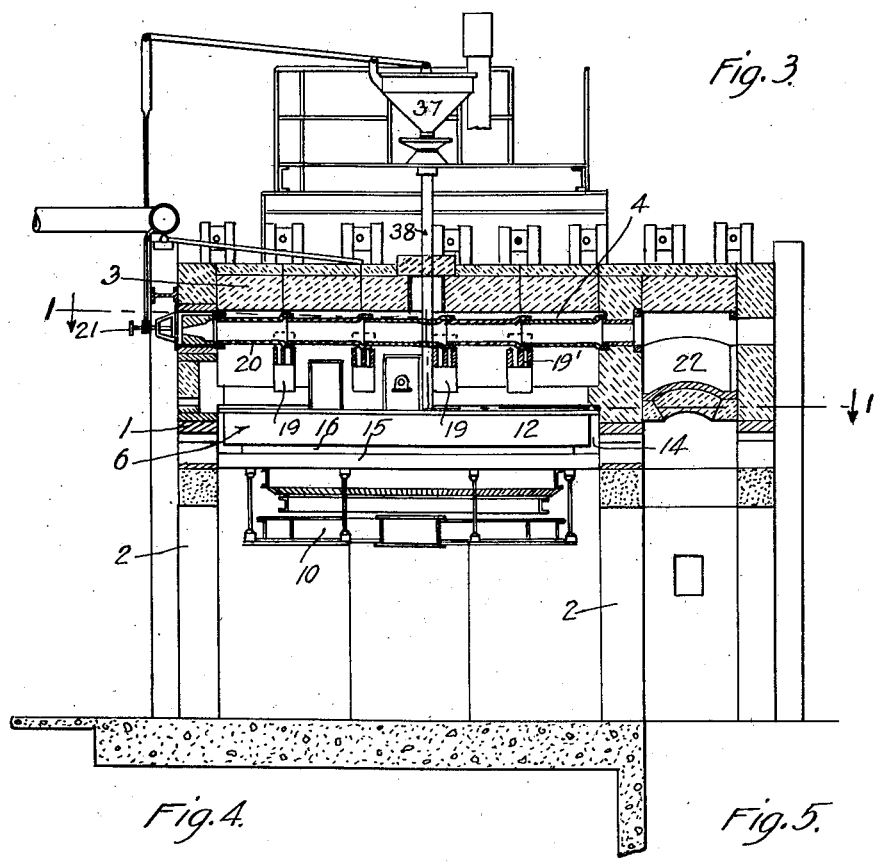
Fig. 3 is a vertical section on line 3—3 in Fig. 1.
Figures 4, 5:
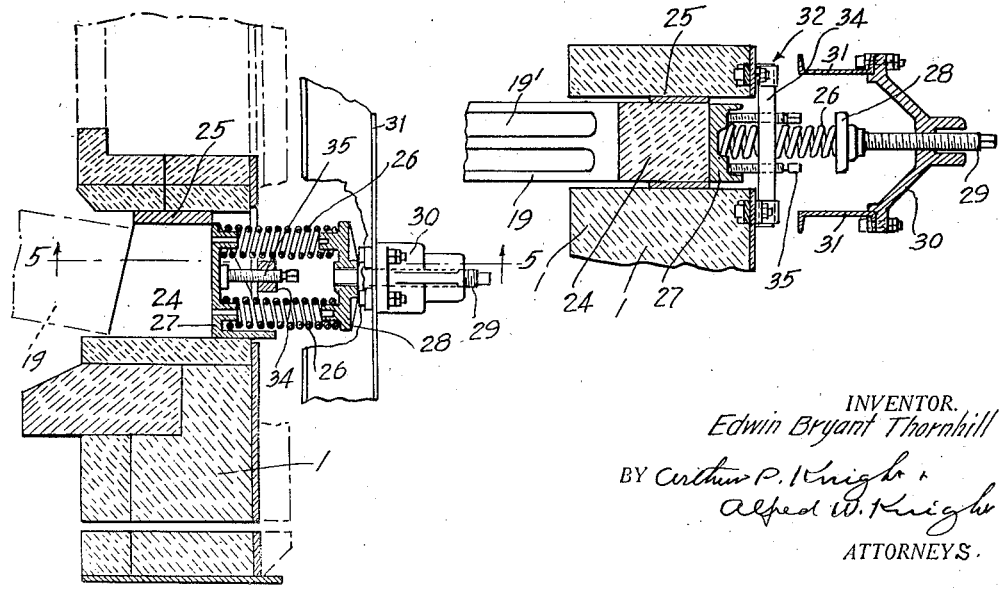
Fig. 4 is a vertical section on line 4—4 in Fig. 1.
Fig. 5 is a horizontal section on line 5—5 in Fig. 4.

In Figures 1 to 5, I have shown the application to my invention of a furnace of the circular hearth type, the wall or casing of the furnace being adapted to enclose a rotary circular hearth. The casing of the furnace comprises a vertical wall 1 which is mounted on supports 2, and a roof member 3 supported on said wall and extending over the furnace chamber 4 which is enclosed by said wall and roof. Said roof is preferably arched and the wall 1 and roof 3 may be of any suitable construction, for example, refractory masonry supported by beams and buck stays in the usual manner of such constructions.

A rotary hearth 6 is shown as mounted within the enclosing wall 1 and below the furnace chamber 4, said hearth being mounted in any suitable manner so as to provide for rotation thereof being, for example, mounted on a central pivotal bearing 7 and being further supported by bearing wheels 8 rolling on suitable track means 9 on supports 10 and track means 11 on the frame 12 of the hearth. For convenience of construction and mounting of the heating means hereinafter described the upper portion of the furnace chamber 4 is preferably made rectangular and the furnace wall is provided with an inwardly extending floor portion 13 forming a circular opening 14 in which the rotary hearth 6 operates with only the necessary clearance. Any suitable means may be provided for maintaining a seal between the rotary hearth and the wall of the furnace, for example, an annular trough 15 may be mounted on said wall and a seal ring 16 may be provided on the hearth frame 12 so as to extend downwardly into sealing material 17 contained in said trough, said sealing material consisting, for example of sand, cinder or any other finely divided material.

The means for heating the furnace chamber comprises a plurality of heating elements extending below the arched roof 3, said heating elements consisting of tubes of refractory material such as carbo-frax or carborundum and being supported on arches which are also of refractory material, for example, carbo-frax or carborundum. Each heating element consists preferably of tubular sections 20 arranged end to end and with the adjacent sections connected in any suitable manner, for example, by means of a bell or enlargement at one end of each section surrounding and over-lapping the adjacent end of the next section. Said heating elements are preferably heated by combustion of gases or other suitable fuel, for which purpose a burner 21 is provided at one end of each tubular heating element positioned and adapted to direct a jet or flame of hot combustion gases into and through the corresponding tubular heating element. At its other end each tubular heating element opens into a flue chamber 22 connected with a suitable flue or stack means for carrying off waste gases. The sectional construction of the tubular heating elements is desirable on account of the fragile nature of the material of which they are composed, as it thereby avoids excessive strains to which the tubes would be exposed under the high temperature condition of the furnace. In order to further minimize such strains and to provide as far as possible for maintaining the tube sections of each element horizontal and in alignment, I prefer to construct the arch supporting means in such manner as to compensate more or less completely for expansion of the material of the arch supports by the heat. Each of said arches is preferably composed of a plurality of wedge shaped arch blocks 19 placed end to end to form an arched structure with the end blocks resting against abutment blocks 24 of refractory material. Each of said abutment blocks may slide in a horizontal guide 25 and is normally supported by springs 26 engaging metal shoes 27, bearing against said blocks and against an equalizing head 28 supported by a screw 29 working in a threaded hole in a yoke 30 which is secured to vertical beams 31 forming a part of the frame of the furnace. A safety stop 32 may be provided for each arch support consisting, for example, of a bar 34 mounted on the wall of the furnace and a screw 35 screwing through said bar and adapted to engage the shoe 27 aforesaid or to be withdrawn therefrom when it is desired to place the compensating device in operative position. In setting up the arches, the shoes 27 are supported temporarily by the screws 35 and when the arches and heating tubes are in place and the supporting springs are properly compressed by operation of screws 29, the screws 35 are turned to release them from the shoes 27, leaving the shoes and the arches supported only by the compensating springs 26.

The arch block 19 may, as shown in the drawings, be made with vertical recesses or slots 19'.

Any suitable means may be provided for supplying to the furnace chamber material to be treated therein, for example, feeding means indicated at 37 may supply material, such as a mixture of finely divided iron ore and coal, through a pipe 38 to the top of the hearth 6. The treated material may be discharged from the hearth through an outlet conduit 39 to a discharge conveyor 40. In case it is desired to rabble the material while being heated suitable means for this purpose indicated at 41 may be provided, such rabbling means extending in the heating chamber 4 above the hearth 6 and being provided with blades 43 adapted to stir the material as it is carried around by the rotary motion of the hearth and to advance the material from the feeding means to the outlet conduit aforesaid.

The operation of the furnace above described, is as follows:

The fuel, preferably combustible gas, is supplied to the burners 21 preferably along with air or steam, or both, to effect the production of a hot flame which is directed from each burner to the corresponding heating tube or element consisting of the tubular sections 20, the waste gases passing off through the flue means 22. In passing through the tubular heating element the hot combustion gases heats the walls of each heating element and the heat is radiated from the heated wall of such tubular heating elements on to the hearth 6, a further amount of heat being radiated to the walls and roof of the furnace, from which it is radiated on to the hearth. Material is supplied to the hearth by the means 37 and by operation of the rabbling means 41 it is caused to travel outwardly over the hearth and is turned over thereon and is finally discharged through the outward means 39. In the operation of the heating means as aforesaid, the arches which support the heating means are also raised to a high temperature and in the resulting expansion of said arch the springs 26 are compressed, thereby compensating more or less fully for such expansion and preventing distortion of the arch to an amount sufficient to cause objectionable displacement of the tubular sections of the heating element.

In applying my invention to an annular furnace, the construction may be modified as shown in Figs. 6, 7, and 8 wherein the furnace is shown as provided with an outer wall 42, inner wall 43, and an annular roof 44, the walls 42 and 43 being circular and inclosing between them an annular furnace chamber 45. Within the inner wall 43 is provided an outlet flue chamber 46 connected with any suitable outlet stack. An annular hearth 48 is mounted in any suitable manner to revolve between inner and outer walls 42 and 43 and below furnace chamber 45. The above described parts may be of any usual or suitable construction such as now in common use in annular furnaces, the walls and roof being of suitable masonry properly supported by metallic frames and the hearth being mounted to rotate on an axis coincident with the center of the annular furnace, and being operated so as to be revolved slowly around such axis by any suitable driving means.

In connection with such annular furnace I prefer to form the heating elements of tubular sections 49 which taper inwardly from the outer wall to the inner wall of the furnace this construction being desirable on account of the decrease in circumferential space as the center of the furnace is approached, the tapering form of the tubular heating means giving maximum heating area without overcrowding. In this form of the invention I prefer to mount the heating elements on arches 50 which extend radially of the furnace, there being an arch extending beneath and in substantially the same vertical plane as each heating element. Said arches and heating elements are preferably formed of refractory material, such as carbo-frax or carborundum and each arch is supported at its inner end by a fixed abutment block 52 and at its outer end by a movable abutment block 53 guided in suitable supporting means 54 and supported radially by spring means 55 which are mounted between a follower member 56 and a supporting member 57 engaged by screw 59 which screws through yoke 60 secured to frame beams 61 extending around the outside of the furnace. Suitable burner means are provided for directing flame into the outer ends of the tubular heating means 49, the inner ends of such tubular heating means opening into the outlet flue chamber 46. In this form of my invention the arches 50 are formed of section which are provided with interengaging projections and recesses as shown at 63.

Safety stop means 64 may be provided for temporarily holding the abutment means in place, said stop means including an adjusting screw 65 and being similar in construction and operation to the stop means 32 above described. Said stop means 32 (or 64) also serve to limit the outward movement of the arch abutments in normal operation or in case of breakage of any of the parts The mode of operation of the form of my invention shown in Figs. 6 to 8 is the same as above described in connection with the form shown in Figs. 1 to 5, except that each arch maintains the corresponding heating tubular means in approximately horizontal alignment throughout its length, by reason of the yielding of the supporting springs 55. It is to be noted that the tapering form of the tubular heating means in this form of my invention is of advantage in that the combustion gases, as they lose heat in passing through the tubular heating elements, become reduced in volume but by reason of the reduction of cross sectional area of the tubular heating means, a substantially constant velocity of the gases may be maintained.

An important feature of the construction above described is that the arches which carry the tubular heating elements are supported on abutments in the walls of the furnace so as to be independent of the roof and to be free to expand or contract under changes of temperature, thereby minimizing strains due to such changes. Moreover the heating elements extend over the respective arches and both the arches and the heating elements thereon are spaced from the roof so as to mount the heating elements as well as the arches independently of the roof, this construction preventing any strains which would be liable to result from contact of the heating elements with the roof.

I claim:

1. A furnace comprising wall means, a roof supported on said wall means, arches of refractory material supported on said wall means independently of said roof, heating elements mounted on said arches, and a hearth below said heating elements.

2. A furnace comprising wall means, a roof supported on said wall means arches of refractory material supported on said wall means independently of said roof and spaced from the roof, heating elements mounted on and extending over said arches so as to be mounted independently of the roof, and a hearth below said heating elements.

3. A furnace comprising wall means, a roof supported on said wall means, arches of refractory material supported on said wall means independently of said roof and radiating heating elements carried by said arches, said arches having abutment means yieldingly mounted on said wall means to provide for expansion or contraction of the arches.

4. A construction as set forth in claim 3 and comprising in addition stop means arranged to limit the outward movement of said abutment means.

5. A furnace comprising wall means, a roof supported on said wall means, heating elements extending within the furnace, arches supported on said wall means and supporting said heating elements, said arches having movable abutment means, spring means operating on said abutment means to yieldingly support the same, and screw operating means for adjusting the pressure of said spring means.

6. A furnace comprising wall means, a roof supported in said wall means, arches supported on said wall means independently of said roof, adjustable means for supporting the ends of said arches to compensate for expansion and contraction of said arches under changes of temperature, radiating heating element extending over and supported on said arches, and a hearth extending below said arches, and adapted to receive heat by radiation from said heating elements.

In testimony whereof I have hereunto subscribed my name this 8th day of October, 1926.

EDWIN BRYANT THORNHILL.